Figure 1:
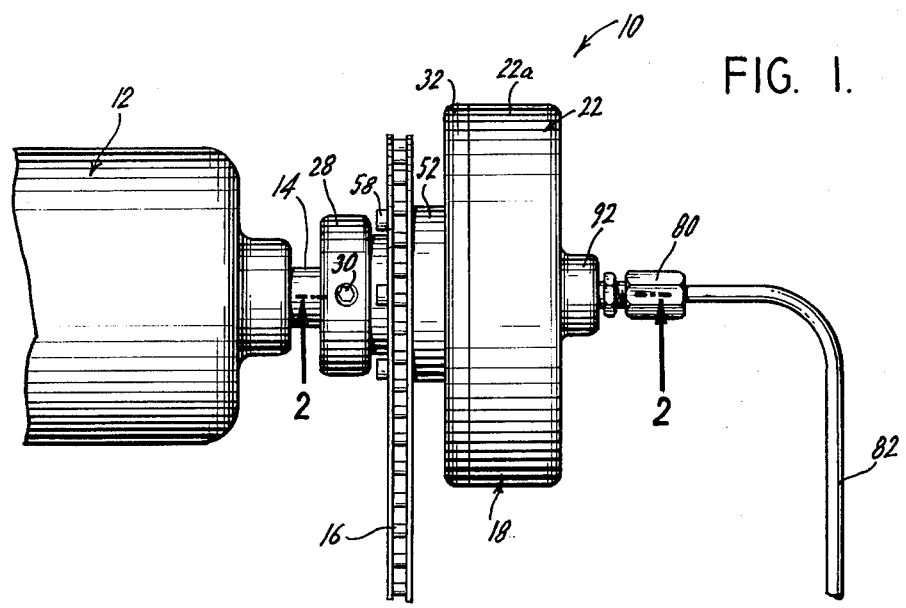

United States Patent [19]
Bignell

[11] 3,887,051
[45] June 3, 1975

[54] FLUID-OPERATED CLUTCH WITH WEAR LIMITING STOP

[75] Inventor: Fred A. Bignell, Emporium, Pa.

[73] Assignee: Emporium Specialties Co., Inc., Austin, Pa.

[22] Filed: Mar. 20, 1974

[21] Appl. No.: 452,932

[52] U.S. Cl............................ 192/85 AA; 192/109 R
[51] Int. Cl............................................. F16d 25/00
[58] Field of Search......... 192/85 AA, 87.17, 70.28, 192/87.16, 87.15, 109 R, 30 W

[56] References Cited
UNITED STATES PATENTS

| | | | |
|---|---|---|---|
| 2,722,302 | 11/1955 | Stoeckicht | 192/85 AA |
| 3,036,681 | 5/1962 | Crosby | 192/85 AA |
| 3,306,408 | 2/1967 | Kahle | 192/85 AA |
| 3,370,682 | 2/1968 | McFarland | 192/85 AA |
| 3,421,608 | 1/1969 | Gorder | 192/85 AA |

Primary Examiner—Benjamin W. Wyche
Attorney, Agent, or Firm—Amster & Rothstein

[57] ABSTRACT

An air-operated clutch including a clutch housing having a facing plate and a backing plate which cooperate to define a cavity in which a driving clutch plate is forced into engagement with a driven assembly in response to the introduction of air under pressure into a chamber formed between the driving clutch plate and the facing plate. A cup-shaped member is located in the cavity between the driving clutch plate and the driven assembly and receives a return spring which is compressed between the bottom wall of the cup-shaped member and the interior face of the driving clutch plate during pressurization of the chamber. When the supply of air is cut off, the return spring operates to urge the driving clutch plate out of engagement with the driven assembly.

5 Claims, 2 Drawing Figures

FLUID-OPERATED CLUTCH WITH WEAR LIMITING STOP

The present invention relates generally to clutches and, in particular, to an improved air-operated clutch adapted for attachment to a drive.

Air-operated clutches are well known and generally include a housing having a facing plate and a backing plate which cooperate to define a cavity in which there is mounted a driven assembly and a driving clutch plate. Typically, the driven assembly includes a driven clutch plate having secured to the opposite faces thereof annular discs of appropriate clutch facing material. In operation, when air under pressure is introduced into the clutch housing, the driving clutch plate is moved into engagement with the driven assembly, with the clutch disc on one face of the driven clutch plate being directly engaged by the driving clutch plate and the clutch disc on the other face of the driven clutch plate engaging the backing plate. When the air supply to the clutch housing is cut off, the driving clutch plate must be immediately disengaged from the driven assembly in order to prevent excessive wear on the clutch discs.

In the past, the clutch plates were allowed to disengage as a result of the slippage between the driving and driven clutch elements. However, such an arrangement was found to be unsatisfactory due to the excessive wear which was caused until the clutch elements were completely disengaged. Various attempts were made to overcome this problem. For example, in one arrangement, return springs were mounted in the facing plate of the clutch housing to pull the driving clutch plate out of engagement with the driven assembly when the air supply was cut off. Each return spring was mounted on a shoulder bolt which extended through a bore formed in the facing plate with the end thereof being threaded into the driving clutch plate. Each return spring was mounted so that is was movable relative to the shoulder bolt and moved between the head of the bolt and an abutment or shoulder formed in the facing plate. Accordingly, when air was introduced into the clutch housing, the driving clutch plate would move into engagement with the driven assembly and would axially displace the shoulder bolt within the bore of the facing plate. In this manner, the return springs would be compressed between the head of the shoulder bolt and the abutment formed in the facing plate. However, once the supply of air to the clutch housing was cut off, the compressed return springs would operate to urge the shoulder bolts and the driving clutch plate attached thereto out of engagement with the driven assembly.

It was soon found, however, that air-operated clutches of the general type described did not operate in a completely satisfactory manner and had a number of drawbacks. For example, as the clutch discs on the opposite faces of the driven clutch plate wore out, the driving clutch plate would operate to wear into the driven clutch plate. As the clutch plates are the most expensive elements to replace in an air-operated clutch, the cost for repairing the clutch and replacing the clutch plates was unacceptably high. In addition, although the return springs would operate for a period of engagements and disengagements of the clutch, they would eventually bind within the bores of the facing plate and would fail to pull the driving clutch plate out of engagement with the driven assembly. Moreover, if there was any play between the driving clutch plate and the clutch housing, the shoulder bolts which were threaded into the driving clutch plate would eventually be sheared off causing the return springs to fail to pull the driving clutch plate out of engagement with the driven assembly. Finally, although sealing rings were placed within the bores of the facing plate around the movable shoulder bolts, leakage of pressurized air from the clutch housing still occurred.

Accordingly, it is a broad object of the present invention to provide an improved air-operated clutch which overcomes one or more of the aforesaid problems. More particularly, it is among the objectives of the present invention to provide an air-operated clutch wherein the driving clutch plate will be prevented from wearing into the driven clutch plate after the clutch discs have worn out; wherein the driving clutch plate is positively and instantanously moved out of engagement with the driven assembly once the air supply to the clutch housing has been cut off in order to prevent excessive wear on the clutch elements; wherein binding of the return spring and its failure to move the driving clutch plate out of engagement with the driven assembly is avoided; wherein the driving clutch plate is positively moved out of engagement with the driven assembly without the use of bolts and without the shearing problems inherent in their use; and wherein leakage of pressurized air from the clutch housing is avoided.

In accordance with an illustrative embodiment demonstrating objects and features of the present invention, there is provided an air-operated clutch which includes a clutch housing having a facing plate and a backing plate which cooperate to define a cavity. Disposed within the cavity is a driven assembly and a driving clutch plate which is movable into engagement with the driven assembly in response to the introduction of air into a pressure chamber formed between the driving clutch plate and the facing plate of the clutch housing. The driven assembly includes a driven clutch plate having secured to the opposite faces thereof annular clutch discs of an appropriate clutch facing material. The driven clutch plate surrounds an axial shaft adapter which operates to transfer the output from a source, such as a motor, to the clutch housing. Mounted within an annular cavity formed between the axial shaft adapter and the driven clutch plate is the novel cup-return spring arrangement of the present invention. More particularly, a cup-shaped member surrounds the axial shaft adapter and is prevented from moving in one direction by a snap ring mounted in a circumferential seat formed in the outer periphery of the shaft adapter. The cup-shaped member is sized to receive a return spring between its cylindrical wall and the outer circumference of the shaft adapter. One end of the return spring is biased against the bottom wall of the cup-shaped member to maintain it in engagement with the snap ring and the other end of the return spring is in engagement with one face of the driving clutch plate. In operation, when air under pressure is introduced into the pressure chamber, the driving clutch plate is urged into frictional engagement with the driven assembly compressing the return spring within the cup-shaped member. Accordingly, when the air supply to the pressure chamber is cut off, the return spring operates to instantaneously and positively urge the driving clutch plate out of engagement with the driven assembly to prevent wear between these clutch elements.

Advantageously, the cup-return spring construction of the present invention operates to overcome many of the problems described above. More particularly, as the clutch discs wear, the driven clutch plate will move towards the backing plate of the clutch housing and, as the cup-shaped member is prevented from moving by the snap ring and return spring, the top surface of the cup-shaped member will gradually protrude beyond the inner face of the driven clutch plate. In this manner, as the clutch discs wear out, the driving clutch plate will be prevented by the protruding top surface of the cup-shaped member from directly contacting the driven clutch plate which would cause the faces of these expensive clutch elements to become worn and scored requiring their replacement. In addition, the cup-shaped member keeps the return spring properly oriented as it moves relative to the shaft adapter and the return spring provides a more positive action to instantaneously disengage the driving clutch plate and the driven assembly. As a further advantage of the present invention, by arranging the return spring to surround the shaft adapter rather than shoulder bolts located in bores of the clutch housing, the above-described problems of binding of the return springs, shearing of the bolts and air leakage from the pressure chamber are avoided.

Figure 2:
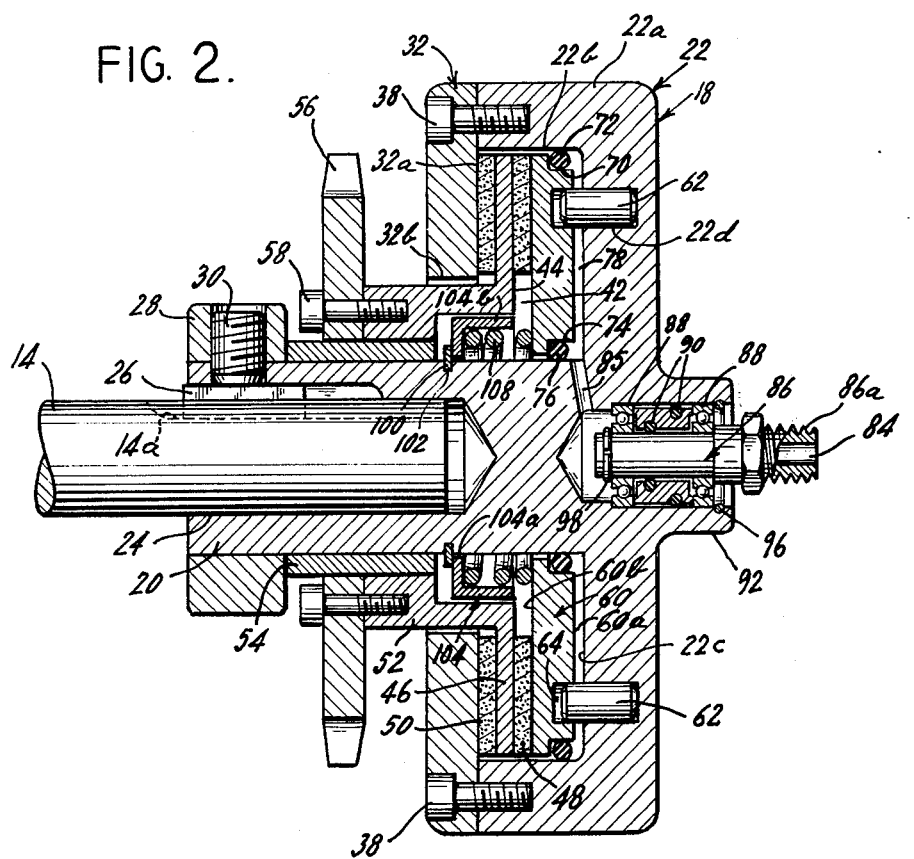

The above brief description as well as further objects, features and advantages of the present invention will be more fully appreciated by reference to the following detailed description of a presently preferred, but nonetheless illustrative embodiment demonstrating objects and features of the present invention, when taken in conjunction with the accompanying drawings, wherein:

FIG. 1 is a plan view, with parts broken away, showing an improved air-operated clutch according to the present invention secured to the output shaft of a motor; and FIG. 2 is an enlarged sectional view, taken substantially along the lines 2—2 of FIG. 1 and looking in the direction of the arrows, illustrating the novel cup-return spring arrangement of the present invention.

Referring now specifically to the drawings and in particular to FIG. 1, there is shown an improved air-operated clutch in accordance with the present invention, generally designated by the reference numeral 10, which is driven by a motor 12 having an output shaft 14. In this illustrative embodiment of the invention, the output from clutch 10 is a drive chain 16 which is coupled to an appropriate sprocket forming part of the clutch, as will be subsequently described.

As shown in FIG. 2, the clutch 10 comprises a clutch housing 18 which includes a central hub having at its left end an axial shaft adapter 20. At its other end, the central hub has provisions for the securement of a rotary fluid coupling to supply fluid to clutch 10 in a manner to be described below. A radially-extending facing plate 22 is integrally formed with the hub at the end removed from shaft adapter 20 and includes an integral axial shaft adapter cylindrical marginal flange 22a. The axial shaft adapter 20 is formed with an axial bore 24 extending inwardly from one end thereof, which bore is of a diameter to receive the output or drive shaft 14 of motor 12. Drive shaft 14 is formed with a longitudinally-extending keyway 14a which receives a key 26. Fitted over the adjacent end of axial shaft adapter 20 is a shaft assembly collar 28 which is secured in place and to key 26 by a tapped set screw 30 which extends radially through shaft assembly collar 28 and has its leading end in engagement with key 26 in keyway 14a. Key 26, keyway 14a and shaft assembly collar 28 provide a convenient means for securing axial shaft adapter 20 and integral facing plate 22 to the drive shaft 14 of motor 12.

Disposed rearwardly of facing plate 22 is a radially-extending backing plate 32 which at its outer periphery is in engagement with marginal flange 22a of facing plate 22. Facing plate 22 and backing plate 32 are secured together at such outer periphery by a number of machine bolts 38 and cooperate to define a cavity 42 having a substantially cylindrical bounding wall 22b at its outer circumferential extent and radially-extending walls 22c, 32a at its opposite sides. Facing and backing plates 22, 32 may be formed by forgings or castings, and are of a design to withstand the pressures encountered during use.

Disposed within cavity 42 is a driven assembly 44 which includes a driven circular clutch plate 46 having secured to the opposite faces thereof annular discs 48, 50 of an appropriate clutch facing material. Driven clutch plate 46 is integrally formed with a mounting sleeve 52 which extends through a central bore 32b formed in backing plate 32 and is mounted on shaft adapter 20 by an appropriate bearing sleeve 54. In this illustrative embodiment of the invention, the outer end of mounting sleeve 52 carries an output sprocket 56 which is secured thereto by appropriate machine bolts 58, with output sprocket 56 having trained thereover output chain 16 which is coupled to the piece of equipment to be driven by clutch 10.

Interposed between driven clutch plate 46 of driven assembly 44 and facing plate 22 of clutch housing 18 is a driving clutch plate 60. Driving clutch plate 60 is slidably mounted for axial displacement relative to shaft adapter 20 by provision of a number of circumferentially-spaced keys or pins 62 which are slidable within appropriate key guideways 64 formed in driving clutch plate 60 and seats 22d formed in facing plate 22. Specifically, two circular keys or pins 62 are provided at opposite sides of shaft adapter 20, with keys 62 being movable within corresponding circular seats 22d and key guideways 64. The complementary circular key guideways 64 are formed in the adjacent face 60a of driving clutch plate 60, with the opposite face 60b contacting the adjacent disc 48 of driven assembly 44.

Provision is made both at the inner and outer periphery of driving clutch plate 60 for providing an airtight seal to clutch housing 18. Specifically, an outer circumferential seat 70 is provided at the outer circumference or periphery of driving clutch plate 60 having thereon an outer O-ring seal 72 in engagement with the adjacent cylindrical wall or surface 22b of flange 22a of housing 18. An inner circumferential or peripheral seat 74 is provided at the inner circumference or periphery of driving clutch plate 60 and has thereon an inner O-ring seal 76 in contact with the adjacent surface of shaft adapter 20. Facing plate 22 and driving clutch plate 60 cooperate to provide a substantially airtight variable volume pressure chamber 78 therebetween, the pressure chamber being bounded on one of its sides by the inner face 22c of facing plate 22 and at the other of its side by adjacent face 60a of driving clutch plate 60.

Provision is made for selectively introducing air under pressure into chamber 78 for axially displacing driving clutch plate 60 into non-slipping engagement with driven clutch plate 46 for coupling the driving element of clutch 10 to the driven element thereof. specifically, a rotary fluid coupling 80 connects an air inlet hose 82 through an air inlet passage 84 and a branch passage 85 to pressure chamber 78. Rotary fluid coupling 80 includes an air inlet pipe 86 formed with air inlet passage 84 extending longitudinally thereof with inlet pipe 86 being rotatably journalled axially of the clutch by one or more bearings 88. In order to preclude air leakage, appropriate sealing rings or washers 90 surround inlet pipe 86 and engage the internal surface of an attachment collar 92 which is integrally formed with facing plate 22. Air inlet hose 82 is secured to an integrally formed threaded extension 86a of inlet pipe 86. In addition, snap rings 96, 98 are provided on either end of inlet pipe 86 in order to secure bearings 88 relative to inlet pipe 86.

When the air supply to air inlet hose 82 and pressure chamber 78 is cut off, driving clutch plate 60 must be immediately moved out of engagement with driven assembly 44 in order to prevent excessive wear on friction discs 48, 50. In order to accomplish this, the clutch 10 of the present invention includes a structure which will operate to instantaneously and positively disengage driving clutch plate 60 and driven assembly 44. More particularly, a cup-return spring arrangement is provided which operates to axially displace driving clutch plate 60 toward facing plate 22 so that it is out of engagement with driven assembly 44. The cup-return spring arrangement includes a snap ring 100 which is seated within a circumferential groove 102 formed in the outer periphery of axial shaft adapter 20. The inner periphery of mounting sleeve 52 adjacent shaft adapter 20 is partially cut away to form a cavity and is adapted to receive an annular cup-shaped member 104 therein. Cup-shaped member 104 is formed with a hole 104a in the botton wall thereof for surrounding axial shaft adapter 20 while the cylindrical side wall 104b of the cup-shaped member is adjacent the inner periphery of mounting sleeve 52. Cup-shaped member 104 is formed so as to provide a space between cylindrical side wall 104b and axial shaft adapter 20 with the space being sized to receive a return spring 108 which is received within cup-shaped member 104 and surrounds shaft adapter 20. Return spring 108 is axially movable along the circumference of shaft adapter 20 and is maintained in position and alignment by cup-shaped member 104. One end of return spring 108 engages the bottom wall of cup-shaped member 104 and operates to maintain it in engagement with snap ring 100 and the other end of spring 108 engages face 60b of driving clutch plate 60 and operates to urge it away from driven assembly 44 when the air under pressure supplied to pressure chamber 78 is cut off.

In operation, when air under pressure is introduced via air inlet hose 82 to pressure chamber 78, driving clutch plate 60 is urged into frictional engagement with driven assembly 44 and its driven clutch plate 46 thereby compressing return spring 108 within cup-shaped member 104. The frictional engagement causes clutch housing 18, which is secured to the drive shaft 14 of motor 12, to be effectively coupled to sprocket 56 of driven assembly 44 which drives chain 16 and the piece of equipment to be driven by clutch 10. However, when the air supply to pressure chamber 78 is cut off, return spring 108 operates to instantaneously and positively urge driving clutch plate 60 out of engagement with driven assembly 44 to prevent wear between these clutch elements.

From the foregoing, it will be appreciated that there has been provided in accordance with the present invention an improved air-operated clutch which overcomes many of the problems heretofore encountered. More particularly, as clutch discs 48, 50 wear, driven clutch plate 46 and mounting sleeve 52 move towards backing plate 32 of clutch housing 18 and, as cup-shaped member 104 is prevented from moving in that direction by snap ring 100, the top surface of cylindrical side wall 104b of cup-shaped member 104 will gradually protrude beyond the face of driven clutch plate 46 which carries clutch disc 48. In this manner, as clutch discs 48, 50 wear out, face 60b of driving clutch plate 60 will be prevented from directly contacting the face of driven clutch plate 46 by the protruding top surface of cylindrical side wall 104b of cup-shaped member 104. Accordingly, cup-shaped member 104 prevents the faces of these expensive clutch elements 46, 60 from becoming worn and scored. In addition, cup-shaped member 104 keeps return spring 108 properly oriented and aligned as it moves relative to shaft adapter 20. Further, return spring 108 provides a more positive action to instantaneously disengage driving clutch plate 60 and driven assembly 44. Finally, by arranging return spring 108 to surround shaft adapter 20, the problems heretofore encountered of binding of the return spring and air leakage from the pressure chamber 78 are avoided.

It may be appreciated from the illustrative embodiments that the construction of the clutch is relatively simple and is capable of use over long periods without servicing. As the friction discs 48, 50 of driven assembly 44 wear, the requisite clutching force is still developed in that driving clutch plate 60 is merely displaced through a somewhat larger axial throw by the introduction of air under pressure into pressure chamber 78. The clutch is essentially compact and may be readily mounted on any one of a number of drive sources, with versatility in the type of output coupling thereto. For example, the driven sprocket 56 of assembly 44 may be readily replaced by a pulley or gear in accordance with the environment in which the clutch is to be employed. Still further, it is a relatively simple matter to integrate the control of the clutch into the operation of a machine since the admission of air under pressure into the clutch via the air inlet 82 may be controlled by a solenoid controlled valve or similar control element.

A latitude of modification, change and substitution is intended in the foregoing disclosure. Accordingly, it is appropriate that the appended claims be construed broadly and in a manner consistent with the spirit and scope of the invention.

What is claimed is:

1. A fluid-operated clutch comprising a clutch housing including an elongated central hub, a facing plate and a backing plate spaced from and coaxial with said facing plate to form an internal cavity within said clutch housing, a driving clutch plate positioned within said internal cavity and about said central hub, coupling means mounting said driving clutch plate for rotation with said clutch housing and for axial movement toward and away from said facing plate, said driving clutch plate and said facing plate forming a variable volume chamber with said central hub, a driven assembly positioned between said driving clutch plate and said backing plate and mounted for rotation on said central hub, said driven assembly including a driven clutch plate having friction means thereon for driving said driven clutch plate when said driving clutch plate is moved away from said facing plate into operative engagement with said driven clutch plate, a cup-shaped member disposed within said internal cavity between said driven assembly and said central hub, a return spring disposed within said cup-shaped member and surrounding said central hub, one end of said return spring engaging one face of said driving clutch plate for urging said driving clutch plate out of engagement with said driven assembly, means axially fixing said cup-shaped member relative to said central hub, said cup-shaped member including means being constructed and arranged for preventing contact between said driving clutch plate and said driven clutch plate when said friction means wears out, passage means in said clutch housing for the entry of fluid into said chamber to increase the volume thereof for moving said driving clutch plate into engagement with said driven assembly, and rotatable fluid coupling means connected to said clutch housing at said passage means for delivering a supply of fluid to said chamber to operate said clutch.

2. A fluid-operated clutch in accordance with claim 1 wherein said means fixing said cup-shaped member relative to said central hub includes a circumferential groove formed in the periphery thereof, a snap ring seated in said circumferential groove, and the other end of said return spring engaging the bottom wall of said cup-shaped member to maintain it in engagement with said snap ring.

3. A fluid-operated clutch in accordance with claim 2 wherein said cup-shaped member is disposed within said internal cavity between said snap ring and said driving clutch plate.

4. A fluid-operated clutch in accordance with claim 3 wherein said cup-shaped member includes a bottom wall and a cylindrical side wall, with the bottom wall having a hole formed therein to surround said central hub and said cylindrical side wall being adjacent an axial wall of said driven assembly and spaced from said central hub, said space being sized to receive said return spring.

5. A fluid-operated clutch adapted to be mounted on a shaft comprising a clutch housing including an elongated hub having a shaft adapter at one end formed with an axial opening adapted to receive a shaft, securement means for securing said adapter to a shaft, a facing plate integrally formed with said hub and extending at right angles to and coaxial with said hub, a backing plate spaced from and coaxial with said facing plate, said backing plate having a central opening therein wtih said hub extending through and beyond said central opening, and a peripheral flange interconnecting said facing plate and said backing plate forming an internal cavity within said clutch housing, a driving clutch plate positioned within said internal cavity and about said hub, coupling means mounting said driving clutch plate for rotation with said clutch housing and for axial movement toward and away from said facing plate, said driving clutch plate and said facing plate forming a variable volume chamber with said hub and said peripheral flange, sealing means for preventing loss of fluid from said chamber, a driven clutch plate positioned between said driving clutch plate and said backing plate and mounted for rotation on said hub, friction means on said driven clutch plate for driving said driven clutch plate when said driving clutch plate is moved away from said facing plate into operative engagement with said driven clutch plate, a cup-shaped member disposed within said internal cavity and surrounding said hub, a return spring disposed within said cup-shaped member and surrounding said hub, one end of said return spring engaging one face of said driving clutch plate for urging said driving clutch plate out of engagement with said driven assembly, means axially fixing said cup-shaped member relative to said hub, said cup-shaped member including axially extending means being constructed and arranged for preventing contact between said driving clutch plate and said driven clutch plate when said friction means wears out, passage means in said clutch housing for the entry of fluid into said chamber to increase the volume thereof for engaging said friction means to interconnect said driving clutch plate and said driven clutch plate, and rotatable fluid coupling means connected to said clutch housing at said passage means for delivering a supply of fluid to said chamber to operate said clutch.

* * * * *